United States Patent [19]
Mieth et al.

[11] Patent Number: 5,732,727
[45] Date of Patent: Mar. 31, 1998

[54] LEAKFREE SWITCHING PROCESS FOR A DOUBLE-SEAT VALVE AND A SEALING SYSTEM FOR CARRYING OUT THE PROCESS

[75] Inventors: Hans Otto Mieth, Büchen; Jürgen Schreiber, Ratzeburg; Markus Pawlik, Büchen, all of Germany

[73] Assignee: Otto Tuchenhagen GmbH & Co. KG, Büchen, Germany

[21] Appl. No.: 601,001

[22] PCT Filed: Sep. 20, 1994

[86] PCT No.: PCT/EP94/03147

§ 371 Date: Mar. 5, 1996

§ 102(e) Date: Mar. 5, 1996

[87] PCT Pub. No.: WO95/08730

PCT Pub. Date: Mar. 30, 1995

[30] Foreign Application Priority Data

Sep. 22, 1993 [DE] Germany .............. 43 32 109.7

[51] Int. Cl.⁶ .................................................. F16K 25/00
[52] U.S. Cl. ........................ 137/1; 137/614.11; 137/242
[58] Field of Search ................... 137/614.11, 614.16, 137/614.17, 614.18, 614.19, 240, 312, 614.01, 1, 242

[56] References Cited

U.S. PATENT DOCUMENTS

| | | | |
|---|---|---|---|
| 4,254,792 | 3/1981 | Schädel | 137/614.16 X |
| 4,483,360 | 11/1984 | Knappe et al. | 137/614.17 X |
| 5,284,182 | 2/1994 | McLennan | 137/614.01 |

FOREIGN PATENT DOCUMENTS

| | | |
|---|---|---|
| 0039319 | 11/1981 | European Pat. Off. . |
| 3242947 | 11/1982 | Germany . |
| 3835944 | 10/1988 | Germany . |
| 668563 | 3/1952 | United Kingdom . |

Primary Examiner—Kevin Lee
Attorney, Agent, or Firm—Lane, Aitken & McCann

[57] ABSTRACT

A process is disclosed for switching without leaks a double seat valve comprising radial sealing elements shaped in a slide-shaped closure member (3). In order to ensure leakfree switching, in a first embodiment of the process, radial sealing elements (1, 1*) are guided and remain sealed in a cylindrical valve seat surface (5) while the valve is opened. Sealing elements (2, 2*) provided in a second closure member (4) sealingly engage an end section (E) of the radial sealing elements (1, 1*) and the end section (E) is sealing surrounded by the sealing means (2) when the valve is further opened and when it reaches its open position. In order to carry out this process, a sealing arrangement is characterized by axial sealing elements (2, 2*) that has an axial sealing surface (2a) that cooperates with an axial valve seat surface (5a), as well as radial sealing surfaces (2b) that cooperate with the end surface (E) of a sealing surface (1a) of the radial sealing elements (1, 1*), such that the radial sealing surface (2b) sealingly surrounds the end section (E) when the closure members (3, 4) engage each other.

19 Claims, 4 Drawing Sheets

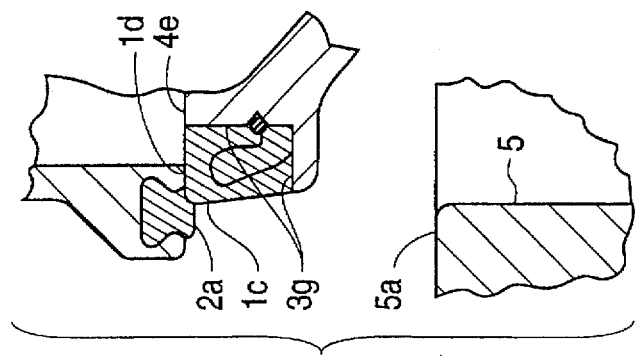
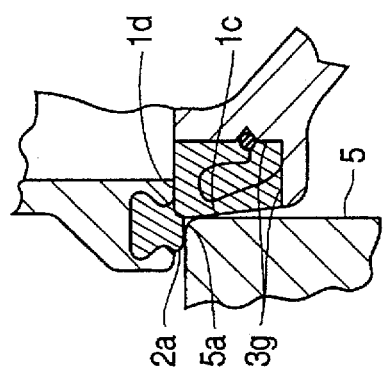
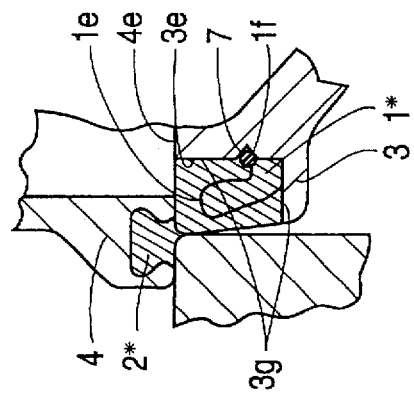
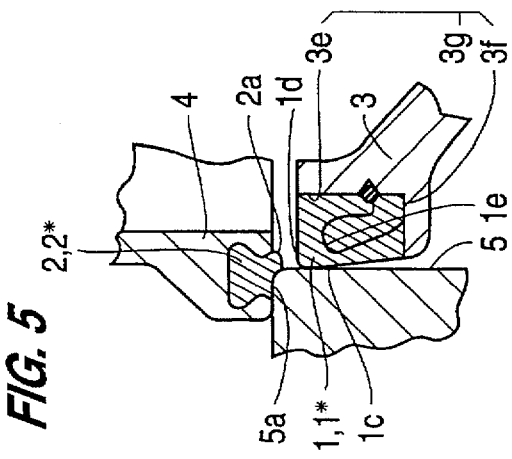

1

LEAKFREE SWITCHING PROCESS FOR A DOUBLE-SEAT VALVE AND A SEALING SYSTEM FOR CARRYING OUT THE PROCESS

BACKGROUND OF THE INVENTION

The invention relates to a process for leakfree switching of a double-seat valve and a sealing system for application of the process.

EP 0 039 319 B1 discloses a sealing system by means of which a process of the type described above can be carded out in approximation; this system ensures low-leakage rather than leakfree switching. In the state-of-the-art sealing system the first closure element, which is designed as a valve piston with radial sealing means, is enclosed and sealed in the area of its end section by a second closure element when the double-seat valve is in the open position; the end of the second closure element facing the valve piston has a recess with a more or less cylindrical circumferential wall whose dimensions are such that the end section of the valve piston is received and sealed during opening and in the open position, before the second closure element opens. When the double-seat valve is in the closed position, the valve piston, with its radial sealing means, has been received into a cylindrical valve seat. Provision is made here such that the cylindrical circumferential surface of the recess in the second closure element is aligned with the cylindrical valve seat and the radial sealing means on the end section of the valve piston are arranged so that they are moved during opening of the valve by the cylindrical valve seat so as to come into sealing contact with the aligned cylindrical circumferential wall of the recess as the valve opens, before the valve piston comes to rest against the second closure element.

A preferred embodiment of the state-of-the-art sealing system is shown in FIG. 2 of EP 0 039 319 B1, together with all the structural details. It is an essential feature of this sealing system that the radial sealing means are at all times supported and protected by a cylindrical circumferential wall both when the valve is in the closed position and in the open position and during the opening process and when the valve is in the open position. As the double-seat valve opens, the radial sealing means engage the circumferential wall of the recess of the second closure element, and, even when the valve is in the open position, the radial sealing means is kept engaged with the circumferential wall of the recess in the second closure element. The engagement is in this case exclusively of the nature of frictional connection, that is, the reaction forces generated in the radial sealing means during elastic deformation of these means provide exclusively for the contact pressure created between the circumferential wall and the radial sealing means, which pressure prevents entry of the pressurized fluid present at the radial sealing means into the leakage cavity between the two closure elements.

GB 668 563 discloses a valve in which radial sealing means-a so-called O ring in this case-mounted in a closure element in the form of a slide are inserted into a closure element in the form of a seat disk as the valve opens and remains there when the valve is in the open position. This older reference discloses that the cylindrical seat area active when the valve is in the closed position is made equal in diameter to that of the cylindrical recess in the seat disk. Although this valve has no leakage cavity provided between the closure elements, and the sealing system devised serves primarily the purpose of protection and support of the radial sealing means, because of deformation of the radial sealing means the frictional connection between the circumferential wall of the seat disk and the radial sealing means must be designed so that no pressurized fluid forced against this seat disk will reach the area of the recess in the seat disk situated beyond the seal.

Disadvantages are inherent in the state-of-the-art sealing systems referred to in the foregoing. A first disadvantage results from the fact that the tightness of the contact between the radial seating means involved and the associated cylindrical circumferential wall of the closure element results exclusively from the frictional connection, because of the limited elastic deformability of the sealing means. In addition, as is to be seen in FIG. 2 illustrating the preferred embodiment of the state-of-the-art sealing system claimed in EP 0 039 319 B1, the process of establishment of contact with the closure dement in the form of a seat disk does not occur under controlled conditions, at least as regards coordination of radial sealing means and cylindrical valve seat. This is demonstrated by the circumstance that the closure element designed as a seat disk, with its axial sealing means, comes to rest first against its associated seat surface, while the valve piston remains in the recess with the radial sealing means. Now if, for any reason whatever and at variance with the declared purpose of the preferred embodiment, the cylindrical valve seat is not aligned with the cylindrical circumferential wall of the recess in which the sealing means are present, the latter are subjected to excessive mechanical stress during the subsequent closing movement in the course of insertion into the cylindrical valve seat, in a way such as to impair the service life.

In this context the situation is said to be remedied by the embedding of the radial sealing means, in this instance designed as a so-called O ring, which embedding is also shown in FIG. 2. The illustration clearly indicates that the O ring is mounted "loose" in its groove in its undeformed position as installed. Inherent in this layout, however, is the disadvantage that closed cavities which are difficultly or not at all accessible to automatic cleaning as cleaning agent flows through the valve are formed beyond the seal in the direction of the bottom of the groove. The purpose of the so-called "loose" O ring layout in the closure element is stated to be that, when this ring is in its deformed state when installed, it will still possess limited mobility within its sealing groove so that, for example, in the event of off-center contact of the closure element designed as a seat disk, the ring will yield to a limited extent during subsequent insertion into the coaxially displaced cylindrical valve seat and so can prevent overloads and sheafing effects.

Another disadvantage of the preferred embodiment of the state-of-the-art sealing system lies in the fact that this system is not leakfree during switching. As is very clearly to be seen from FIG. 2 of EP 0 039 319 B1, after the axial sealing means mounted in the seat disk have come into contact with the associated seating surface, a cavity is formed temporarily between the two sealing means in the course of the subsequent closing movement during insertion of the radial sealing means into the associated cylindrical valve seat, in which cavity is enclosed the fluid present in the valve before it is closed. After the radial sealing means have been fully inserted into the cylindrical valve seat when the valve is in the closed position, the fluid trapped between the sealing means of the two closure elements can flow into the leakage cavity and can escape as so-called switching leakage by way of the connection of the cavity to the area enclosing the valve.

There has been no dearth of other proposals for sealing systems with radial sealing means in a closure element designed as a slide whereby one or another of the disadvantages in question can be avoided. In this connection DE 32 42 947 C2 discloses a sealing system in which a preferably cylindrical ring chamber is mounted as leakage cavity between the two tapering valve disks each having tapering bearing surfaces and in which a seal resting against the inner jacket of the cylindrical ring chamber is associated with the first valve disk and simultaneously serves the purpose of sealing the tapering valve seat of this valve disk. In a preferred embodiment of this state-of-the-art sealing system the seal resting against the inner jacket of the cylindrical ring chamber is mounted between the contact surfaces of the two valve disks in such a way that during the through switching process of the first valve disk the seal remains in the area of the ring chamber or seals while traveling through it until a connection sealing the leakage cavity valve spaces has been established between the first and the second valve disks.

This last-named sealing system does prevent cavity formation between seal and associated groove, since the seal is embedded there by form locking and frictional connection, but FIG. 2 of DE 32 42 947 C2 makes it clear that this sealing system as well is not leakfree during switching. In contrast to the sealing system claimed in EP 0 039 319, when the valve is in the open position as claimed in DE 32 42 947 C2 the valve interiors are sealed off from the leakage cavity in that the first valve disk, which also functions as a slide, together with its end surface facing the leakage cavity, comes in axial contact with and is forced against the seal of the second valve disk. The first valve disk is primarily a seat disk in which sealing off from the associated seating surface is effected by way of axially acting sealing means when the double-seat valve is in the closed position. Hence what is involved in the case of the double-seat valve as claimed in DE 32 42 947 C2 and the sealing system incorporated in it is essentially a subject belonging to a category other than that of this application. Similarly, just as the sealing action between the first valve seat and the associated seating surface is accomplished by axial application of this seal to the latter when the state-of-the-art valve is in the closed position, so also the sealing action between the two valve disks when the valve is in the open position and in relation to the leakage cavity is effected exclusively through axial application of the seal mounted in the second valve disk to the end surface of the first valve seat facing the leakage cavity. What is involved in the "axial docking" of the seal in question on the first valve disk is form locking contact whose surface pressure, in contrast to that of the object of EP 0 039 319 B1, where frictional connection results exclusively from the potential deformation of the seal in question, derives from the dimensions of the drive determining the movement of the two valve disks relative to each other.

The generic double-seat valve described in EP 0 039 319 B1 is characterized essentially by the following noteworthy features:

1. When the double-seat valve is in the closed position, the seals in the seat disk and in the valve piston operate independently of each other.
2. The seat disk has a cylindrical recess into which the radial sealing means of the valve piston are fully inserted when the valve is in the open position.
3. When the double-seat valve is in the open position, the radial seal operates in conjunction with the internal cylindrical circumferential wall of the recess in the second closure element. In addition, a functional relationship must exist between the diameter of the external circumferential surface of the valve piston and the diameter of the internal circumferential surface of the recess in the seat disk, that is, the diameter of the cylindrical valve seat must be made equal in diameter to that of the internal cylindrical circumferential wall of the recess, so that, when the double-seat valve opens and assumes the open position, the valve piston can be switched so as to provide sealing and be more or less leakfree when received into the recess.
4. The axial seal is mounted in the seat disk so that a space is left when it encloses the recess.

SUMMARY OF THE INVENTION

The present invention has set as its goal that of ensuring leakfree switching when radial sealing means are used in a slidelike closure element, and also that of improving the service life of radial sealing means while ensuring microbiologically flawless mounting.

An essential advantage of the process claimed for the invention is represented by the fact that, firstly, the two sealing means are applied to the associated seating surfaces under controlled conditions as the double-seat valve moves to close and, secondly, in contrast to the state-of-the-art sealing system, as the valve moves to open, the radial sealing means remain under controlled conditions and sealed in their cylindrical valve seat, while in a first alternative embodiment of the process they achieve sufficient sealing engagement with the sealing means in the second closure element by way of their end section. In the opposite direction, during movement to close, the sealing means remain in sufficient sealing engagement with each other until the radial sealing means have again been placed securely under controlled conditions in the associated cylindrical valve seating surfaces and have been sealed.

A second alternative process proposed increases the service life of the sealing means, specifically, by preventing frictional movements of sealing means relative to each other. This alternative proposal consists of the circumstance that the sealing means provided in the second closure element engage an end section of the first closure element to create sealing and enclose the latter to provide sealing. With respect to the radial sealing means and to the sealing means provided in the second closure element, a mating of materials is involved, one which consists of sealing means and of a metal seat surface.

Two additional advantageous process designs are to be derived from the basic principle of the invention claimed in the foregoing. First of all, the sealing engagement of sealing means not only may be accomplished other than by frictional connection as is provided in state-of-the-art sealing systems; it may also be designed as form locking. Form locking engagement yields the advantage that the forces acting between the contact areas of the sealing means are determined not just on the basis of the permissible deformation of the radial sealing means but also on that of the relative movement of the closure elements, which can be acted on by way of the valve drive, the relative movement being limited by a stop between the two sealing means. This stop is a desirable safety stop in the case of form locking engagement and a necessary alternative in the case of the frictional connection alternative.

Another advantageous process design achieves leakfree switching to a degree of definition not attainable with state-of-the-art systems. This succeeds in that in the course of valve closing movement the radial sealing means firstly engages the cylindrical valve seat surface so as to provide sealing, before the sealing means of the other closure element comes in contact with its valve seat surface, and secondly in that the subsequent establishment of contact between the sealing means and its associated valve surface, as viewed in the radial direction, begins in the interior and then continues outward radially until the sealing means reaches a final position on the valve seat surface. In the process the fluid present between the seat surface and the sealing means in question is displaced progressively outward radially from the seat surface area; trapping of the fluid to be displaced can be reliably prevented.

In order to carry out the process claimed for the invention, in a preferred embodiment the sealing means in the sealing system in the second closure element, which have a state-of-the-art sealing surface, are additionally provided with a radial sealing surface, the latter acting in conjunction with the sealing surface of the radial sealing means, primarily with the end section of the latter.

It is advantageous to provide the radial sealing means of the first closure element with a slightly curved convex sealing surface. This attains the object of causing the radial sealing means first to be in sealing engagement with the sealing means of the second closure element and then to be guided and effect sealing inside the cylindrical valve seat surface.

The sealing system for application of the second alternative process provides for action of the radial sealing surface of the sealing means in the second closure element in conjunction with the end section of the first closure element and for sealing enclosure by the radial sealing surface of this end section while the closure elements are engaged with each other. The end positions are delimited by a stop positioned between the two closure elements, preferably a metal stop. This alternative sealing system ensures an especially long service life for each of the sealing means provided, since the material mating consists on one side of the sealing means and on the other of the preferably metal seat surface.

It is to be noted that the sealing means of the second closure element need not be axial sealing means, to the extent that they do not affect engagement with the end section of the radial sealing means. The process may in theory also be applied to sealing systems in which the second closure element is also designed as a valve piston with radial sealing means.

Each of the two sealing means is preferably designed as a one-piece elastomer seal which is embedded by form locking and frictional connection, as applicable, in a groove widening toward its base. Such embedding, in the form of so-called encapsulation, first reliably prevents forcing of a seal from its groove by the action of pressure forces originating in the fluid present, and then dependably avoids cavity formation beyond the seal in connection with the resulting microbiological problems. The dimensioning also proposed in this connection, as a large-volume ring, of the radial seal of the closure element designed a valve piston results in low stresses in operation of the seal and, as a result of this circumstance, in low wear and a long service life for the radial seal.

When the radial seal has been installed, it has a sealing section projecting from its groove, a section which, in a preferred embodiment of the proposed sealing system, may be designed to overhang the groove on both sides so that the possibility will exist there of radial support by the valve piston. Such support is advantageous first in sealing engagement with the sealing means of the second closure element and then in introduction of the radial seal into the cylindrical valve seat surface or when the sealing means are withdrawn, inasmuch the overhanging sealing section enlarges the area of engagement of the seal without creating stability problems.

If the radial sealing surface of the sealing means, or the seal of the second closure element, tapers in the direction of the opening movement of the valve, advantageous form locking engagement of the sealing means is accomplished in addition to their engagement by frictional connection. The radial sealing surface in this form acts as it were as a carrier diagonal for the radial sealing means in the independently actuatable active valve piston.

If the axial sealing surface of the seal mounted in the second closure element rises, as viewed radially, in addition to the frictional engagement, extending from the interior outward and away from the associated valve seat surface, and also forms a common revolving sealing edge with the radial sealing surface, then this seal design permits leakfree switching not possible in the past with state-of-the-art sealing systems.

The proposed sealing system is especially well suited for double-seat valves of the design known from WO 93/16306; an embodiment as shown in FIG. 3 of this reference can be provided with all the advantages of the proposed sealing system claimed for the invention. The embodiment in question of the state-of-the-art double-seat valve is characterized in that the second closure element designed as a seat plate has a bore which is oriented coaxially with the cylindrical valve seat surface and is equal in diameter to it, the bore extending to the vicinity of the double-seat valve. A design such as this makes it possible to mount the double-seat valve horizontally and to empty the leakage cavity fully, so that no residue is left.

In contrast to the equal-diameter layout, emptying of the leakage cavity with the double-seat valve in the horizontal position is additionally facilitated by the fact that the bore provided in the second closure element is larger in diameter than the cylindrical valve seat surface.

If minimal residual amounts may remain in the leakage cavity temporarily with the double-seat valve mounted horizontally, until they are removed from the area between the two sealing means by the next opening stroke, another embodiment of the sealing system provides that the internal diameter of the bore in the second closure element is smaller by a double radial spacing a between zero and 0.5 mm, preferably a=0.2 mm. As a result of this measure the seal of the second closure element is supported, as viewed in the direction of opening of the double-seat valve, by the reduction in diameter of the bore resulting from the radial spacing a; this reduction in diameter is effective mainly in sealing engagement of the seals.

A second sealing system advantageously applying the first process alternative replaces the more or less radially oriented reciprocal engagement of the sealing means in the sealing system discussed in the foregoing with a more or less axial reciprocal contact. This embodiment is characterized by low-wear behavior and is also less susceptible to dimensional variations and has larger deformation margins than the first sealing system. The radial sealing means are mounted at the end of the end section of the first closure element and are delimited by a radial and an axial sealing surface each forming a continuous unit. The external portion of an axial sealing surface of the axial sealing means acts, as viewed radially, with the axial valve seat surface, and its internal portion with the axial sealing surface adjacent to the radial sealing surface. In a preferred embodiment the radial sealing means has on its side facing the cylindrical valve seat surface a jacket surface widening in the direction of the axial sealing means; the end section adjacent to the axial sealing means is designed so that, on the one hand, cavity formation on contact with the axial sealing means is avoided and, on the other, that an optimum sealing and stripping effect is ensured. The end position of the two closure elements relative to each other is limited in sealing engagement by means of a stop provided between the closure elements.

While the one-piece seal mounted in the second closure element is embedded by form locking and frictional connection in a groove widening toward the bottom of the groove, it has been found to be advantageous, as is provided by another embodiment of the sealing system, to mount a one-piece seal in a recess in the first closure element, the recess being made up of an external jacket surface provided on the first closure element and an end surface adjoining this jacket surface. This layout at the end of the end section of the first closure element ensures simplicity of mounting of the seal.

The stability of the seal mounted in the recess is improved by providing the seal, in another embodiment, with an inserted component. Provision of this seal also ensures that the seal undergoes deformation only in the areas of the latter relevant to the sealing action. In order to make mounting of the seal in the first closure element simple and to ensure reliable immobilization in the recess, the external jacket surface making up one side of the recess has, in another preferred embodiment of the sealing system, a groove into which a ring is inserted when the seal is in the installed position, the ring forming, with a section projecting from the groove, form locking inside the jacket surface with the inserted component.

If the axial sealing surface of the sealing means provided in the second closure element, as viewed radially, rises from the interior outward, when the second closure element is applied to the associated seat surface the fluid present there is forced radially outward so that leakfree switching is promoted.

If the reciprocal form locking and frictional connection engagement of the sealing means does not suffice to limit the movement of the two closure elements relative to each other, another embodiment of the sealing system provides a stop, which is preferably of metal and is mounted, for example, in the area of the closure elements or of the drive.

The process proposed and the advantages deriving from it can also be achieved with a sealing system in which the closure elements and the associated sealing means are each made in one piece, the range of action of the sealing means exhibiting elastomeric properties.

The process proposed is explained in what follows with reference to the figures of the drawing, within the framework of three sealing systems selected as examples.

BRIEF DESCRIPTION OF THE DRAWING

FIGS. 5 through 8 show: cross-sections through the closure elements of a double-seat valve in the area of another sealing system for application of the first alternative process in the valve positions to be seen in FIGS. 1 through 4 (closed position, pickup position, end of beginning of the pickup position, and open position of the double-seat valve)

DETAILED DESCRIPTION OF THE PREFERRED EMBODIMENTS

Figure 1:
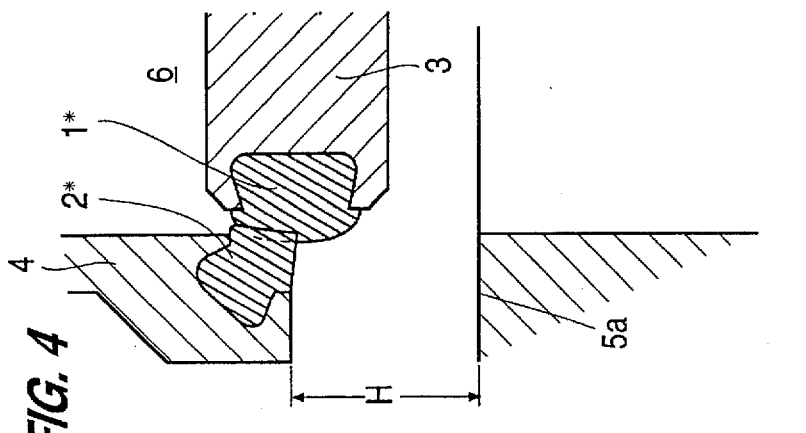
FIGS. 1 through 4 show: cross-sections through the closure element of a double-seat valve in the area of a first sealing system for application of a first alternative process, FIG. 1 showing the closed position, FIG. 2 the so-called pickup position, FIG. 4 the double-seat valve in the open position, and FIG. 3 the end or beginning of the sealing action of the radial sealing means in the associated cylindrical valve seat surface.

A first closure element 3 designed as a valve piston with radial sealing means 1 (in the embodiment shown in FIG. 1 the closure element is in the form of a one-piece seal 1* having a slightly curved convex sealing surface 1a) is received into and effects sealing inside a cylindrical valve seat surface 5 when the double-seat valve is in the closed position. A second closure element 4 in the form of a seat disk has sealing means 2, which in FIG. 1 are also in the form of a one-piece seal 2*. An axial sealing surface 2a of the latter rests on a coordinated axial valve seat surface 5a, while a radial sealing surface 2b, which tapers in the direction of the opening movement of the double-seat valve, is free in the direction of a leakage cavity 6. The axial and the radial sealing surfaces 2a and 2b form a common circular sealing edge K in the area of the circumference of the cylindrical valve seat surface 5.

Figure 2:
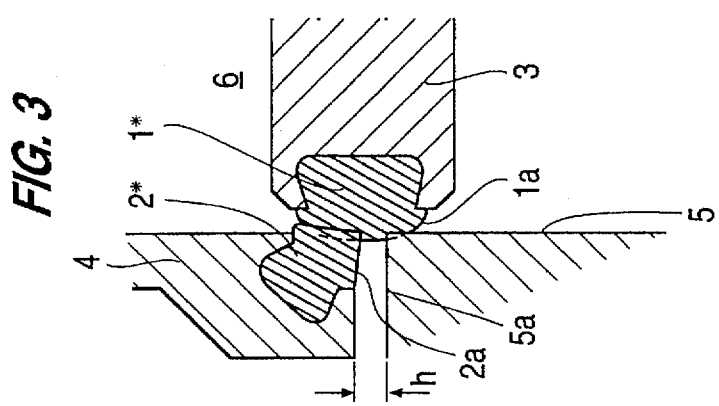
Figure 3:
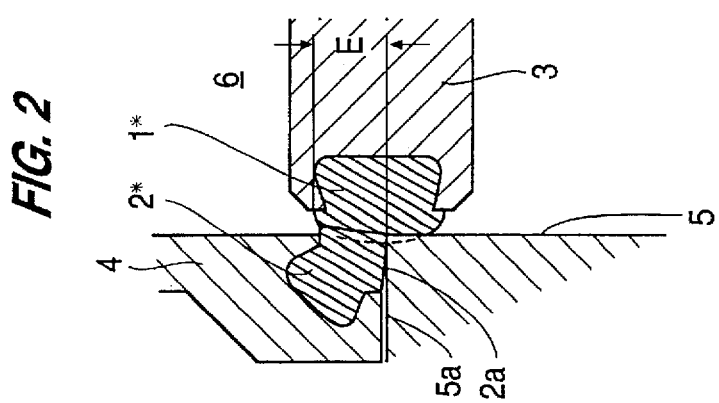
Figure 4:
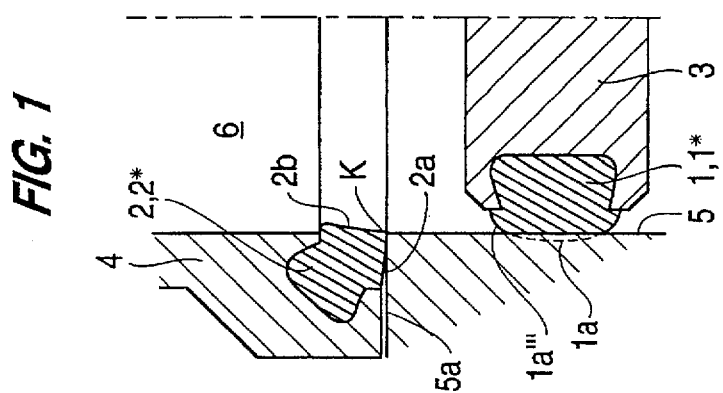

FIGS. 2, 3, and 4 illustrate the opening process of the double-seat valve. In FIG. 2 the valve piston 3 has been displaced so far in the direction of the second closure element 4 that the radial seal 1* with an end section E has engaged the seal 2* so as to effect sealing, the radial seal 1* remaining under controlled conditions and sealed in the cylindrical valve seat surface 5. The seal 2* is still positioned on the associated axial valve seat surface 5a with its axial sealing surface 2a.

As is to be seen from FIG. 3, the second closure element 4, with its axial sealing surface 2a, is one partial stroke h removed from the axial valve seat surface 5a, the seals 1*, 2* being engaged with each other so as to effect sealing. Because of the slightly curved convex sealing surface 1a of the seal 1*, the latter leaves precisely the cylindrical valve seat surface 5, and then, after leaving this position, relinquishes its control through the cylindrical valve seat surface 5 and the sealing by this surface.

FIG. 4 illustrates the fully open position of the double-seat valve reached through a full stroke H; the end section of the radial seal 1* is enclosed radially inside the seal 2* so as to effect sealing and also remains enclosed for as long as the open position continues.

Figure 2A:
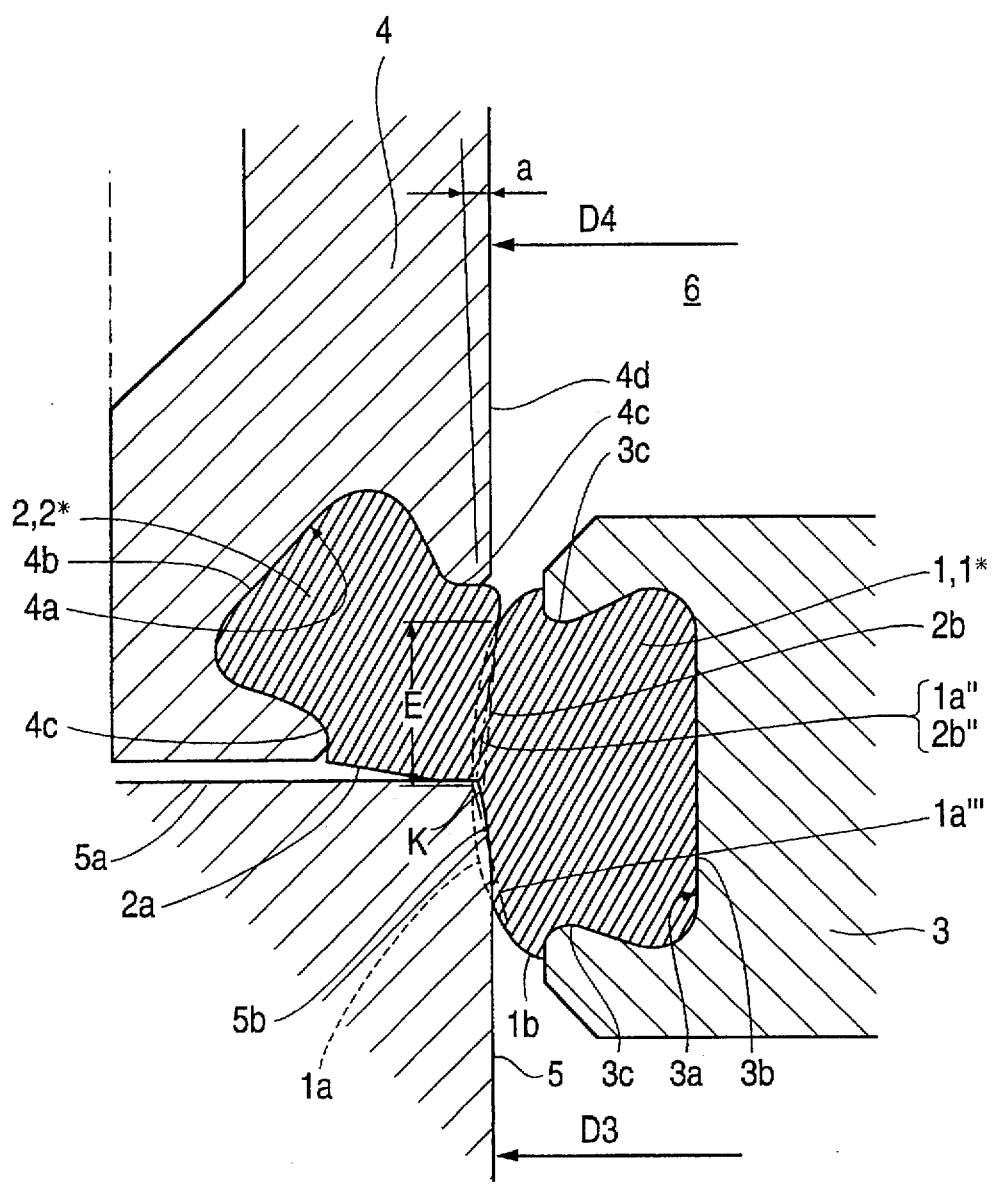
FIG. 2a, shows, also in cross-section, an enlarged illustration of the system shown in FIG. 2, in order to explain the essential features of reciprocal engagement of the sealing means and engagement with their associated valve seat surfaces.
Figure 12:
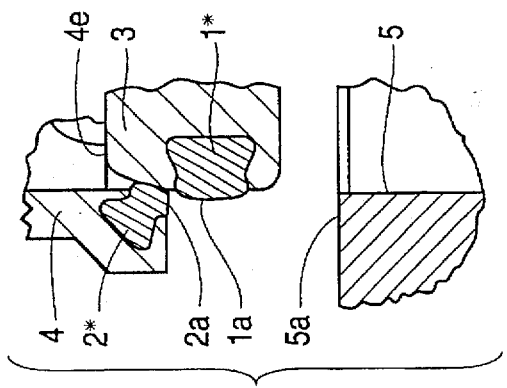
FIGS. 9 through 12 show: cross-sections through the closure elements of the double-seat valve in the area of a sealing system for applying a second alternative process in the four valve positions referred to in the foregoing.
Figure 11:
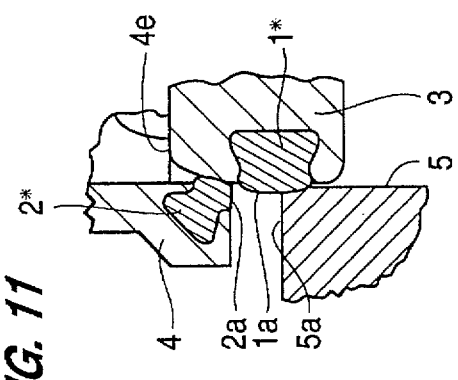
Figure 10:
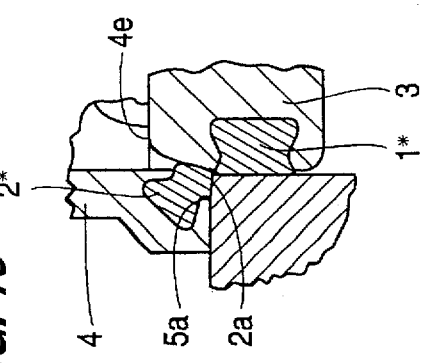
Figure 9:
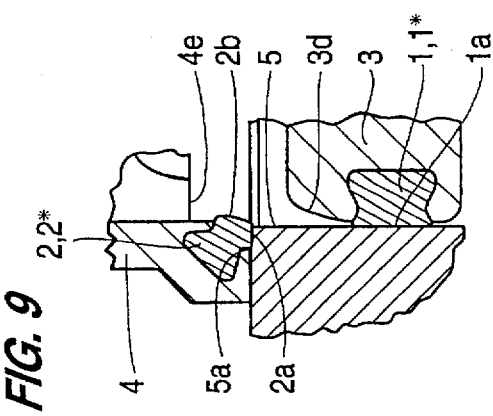

Details of reciprocal engagement of seals 1* and 2* so as to effect sealing are to be seen in FIG. 2a. Both seals undergo deformation in the area of end section E of radial seal 1*. The exposed radial sealing surface 2b shown in FIG. 1 now assumes in end section E, together with the associated sealing surface 1a, the position designated as 1a", 2b". In the area outside end section E, radial seal 1a" has the profile designated as 1a'", seal 1a" fitting tightly in this area against an inlet side 5b of the cylindrical valve seat surface. An interface of the seals 1*, 2* brought together in form locking and frictional connection in the area of inlet edge 5b is designated as K.

Radial seal 1* is embedded by form locking and frictional connection in a groove 3a, which, starting at groove sides 3c rounded in the direction of the cylindrical jacket surface of the valve piston 3, widens toward groove base 3b. Identical embedding or encapsulation is also provided for seal 2*, the associated groove being designated as 4a, the base of the groove as 4b, and the sides of the grooves as 4c. The embedding illustrated of seals 1* and 2* in their groove 3a or 4a avoids formation of a cavity beyond the seal involved and prevents forcing of a seal from its sealing groove by fluid pressures.

FIG. 2a also makes it clear that seal 1* overhangs the groove on both sides 3c in a section 1b and rests there in the radial direction on the valve piston 3. As a result of this measure, the effective area of the radial seal 1* is increased on both sides.

FIG. 2a also shows that axial sealing surface 2a of seal 2*, as viewed radially, rises outward away from the associated axiatlve seat surface 5a. This design ensures that establishment of contact by seal 2* in the closing process is accomplished in such a way that contact between the seal and the axial valve seat surface 5a begins at the interface K facing the latter between seals 1*, 2* joined together by form locking and frictional connection and continues radially from the interior outward, up to an end position of seal 2* on the coordinated valve seat surface 5a.

It is also to be seen from FIG. 2a that the second closure element 4 has a bore 4d oriented coaxially toward the cylindrical valve seat surface 5, the interior diameter D4 of which bore is designed to be double a radial distance a shown, which is smaller than the diameter D3 of the cylindrical valve seat surface 5. The value selected for radial distance a is in the range of 0 to 0.5 mm, a value a=0.2 mm having been found to be especially advantageous. Seal 2* is supported to advantage in the area of groove side 4c in question, especially during sealing engagement with radial seal 1*, as a result of reduction of the internal diameter of bore 4d. Equality of diameters (D3=D4) is provided for the event that priority is to be assigned to achieving satisfactory emptying of the leakage cavity 6 when the double-seat valve is mounted horizontally.

Passage of radial seal 1* by seal 2* in the direction of the leakage cavity 6 beyond the relative movement of closure elements 3, 4 required by full stroke H in the open position is reliably prevented by a preferably metal stop not shown. This stop comes into play only if the relative movement of closure elements 3, 4 required for achievement of the regular, complete open position of the valve and determining the form locking and frictional connection engagement of seals 1*, 2* is exceeded.

Discussion has already been devoted to the possibility of designing closure elements 3, 4 and associated sealing means 1 or 2 in one piece, the area of operation of sealing means 1, 2 possessing elastomeric properties. With the exception of the design measures and requirements resulting from the embedding of independent seals 1*, 2* in their respective grooves, a one-piece design such as this has process engineering advantages comparable to those of the sealing system described in the foregoing. The outwardly projecting geometric shape of the sealing means remains to the greatest possible extent unaffected by the one-piece design.

Another sealing system applying the first process proposed, as claimed for the invention, is illustrated in FIGS. 5 through 8. There is a one-piece seal 1* provided with an insert element 1e in a recess 3g in the first closure element, which is made up of an external jacket surface 3f adjoining this element. This seal 1* has a radial sealing surface 1c which operates in conjunction with the cylindrical valve seat surface, and also an axial sealing surface 1d, each of the two sealing surfaces forming one uninterrupted surface. There are axial sealing means 2, a one-piece seal 2* provided with an axial sealing surface 2a, in the second closure element 4; the latter sealing surface 2a, as viewed radially, interacts with its external portion with axial valve seat surface 5a, and with its internal portion with axial sealing surface 1d adjacent to radial sealing surface 1d.

The individual illustrations clarify the sequence of movement, from the closed position (FIG. 5) to the open position (FIG. 8); the description in connection with FIGS. 1 through 4 concerning the sequence of movement is to be applied correspondingly to FIGS. 5 through 8.

It is to be seen that in the pickup position (FIG. 6) the first closure element 3 has come to rest against a stop 4e provided on the second closure element 4. Recess 3g cannot independently ensure form-locking embedding of seal 1*, if, as is provided, the external jacket surface 3e is made more or less cylindrical for the purpose of simplicity of mounting seal 1*. In order to achieve efficient form locking, the proposed layout provides a groove 1f made in the external jacket surface, in which groove a ring 7 is mounted when seal 1* is in the embedded position; a section of the ring projecting from the groove 1f creates efficient form locking with inserted component 1e inside the jacket surface. For purposes of installation the ring 7, combined with the seal 1* enclosing it, must be extended so that it slides over the external jacket surface 3e and then snaps into the groove 1f in the area of the latter. Removal of the seal 1*, of course, necessarily entails destruction of the seal.

The sealing system shown in FIGS. 9 through 12 differs from that illustrated in FIGS. 1 through 4 essentially in that the two sealing means 1, 1* and 2, 2* are directly engaged with each other. When the closure elements 3, 4 are engaged with each other, the radial sealing surface 2b of axial sealing means 2 rather encloses the end section 3d of the first closure element 3. In the pickup position, if the second closure element 4 with axial sealing surface 2a of its axial sealing means 2 is just leaving the associated axial valve seat surface 5a, the first closure element 3 is stopped by a stop 4e on the second closure element 4. The subsequent movement, from the pickup position (FIG. 10) to the fully open position (FIG. 10), is clarified by the pertinent illustrations. The sealing system described in the foregoing is characterized by an especially long service life, since it avoids reciprocal relative movement of sealing means 1, 2 in the process of engagement of closure elements 3, 4 with each other.

We claim:

1. A process for leakfree switching of a double-seat valve in which radial sealing means is used in a first closure element in the form of a slide, with a second closure element (4) mounted in series with the first closure element (3) designed as a slide and movable relative to this first closure element (3), both closure elements (3, 4) preventing overflow of fluids from a first valve housing part into a second valve housing part when the valve is in the closed position and, in both the closed and the open position, also delimiting a leakage cavity (6) which is connected to the surroundings of the valve, the process accomplishing movement between the closed position and the open position while preventing flow of fluids into the leakage cavity, and the first closure element (3) with its radial sealing means (1), in the closed position, being received so as to effect sealing inside a substantially cylindrical valve seat surface (5), in the open position, being sealed with the second closure element (4), and during opening movement, being engaged with the second closure element (4) so as to effect sealing, before the latter opens, wherein the radial sealing means (1) is mounted such that, in the process of opening of the valve, the radial sealing means is guided in the cylindrical valve seat surface (5) and remains sealed, while the first closure element (3) with its radial sealing means (1) engages a second sealing means (2) provided in the second closure element (4) so as to effect sealing of the second sealing means with one of an end section (E) of the radial sealing means (1) and an end section (3d) of the first closure element (3), and wherein the end section with which the second sealing means is sealed is enclosed by the second sealing means (2) so as to effect sealing during further opening movement and in the subsequent open position.

2. A process as claimed in claim 1, wherein sealing engagement between one of (a) the radial sealing means and the second sealing means, and (b) the second sealing means (2) and the first closure element (3), is accomplished by at least one of form locking and frictional connection, and wherein engagement is limited by a stop determining the movement of the closure elements (3, 4) relative to each other.

3. A process as claimed in claim 1, wherein contact between the second sealing means (2) with its associated valve seat surface, as viewed radially, begins in the interior and proceeds thence radially outward until the second sealing means (2) reaches an end position on the valve seat surface (5a).

4. A sealing system for leakfree switching in a double-seat valve with two series-mounted closure elements (3, 4) movable relative to each other, which sealing system prevents overflow of fluids from a first valve housing component when the valve is in the closed position and which, in both the closed and the open position, delimits a leakage cavity (6) which is connected to the surroundings of the valve, with a first closure element (3) in the form of a valve piston with radial sealing means (1) and a second closure element (4) in the form of a seat plate with axial sealing means (2), the system accomplishing movement between the closed position and the open position while preventing flow of fluids into the leakage cavity, the first closure element (3)

being received in the closed position so as to effect sealing inside a substantially cylindrical valve seat surface (5), being sealed in the open position with the second closure element (4), and engaging in its opening movement the second closure element (4) before the second closure element opens, wherein the axial sealing means (2) has an axial sealing surface (2a) operating in conjunction with an axial valve seat surface (5a) and additionally a radial sealing surface (2b) operating in conjunction with one of an end section (E) of a sealing surface (1a) of the radial sealing means (1) and an end section (3d) of the first closure element, and wherein, when the closure elements (3, 4) are engaged, the radial sealing surface (2b) encloses the end section of one of the sealing surface of the radial sealing means and the first closure element so as to effect sealing.

5. A sealing system as claimed in claim 4, wherein the sealing surface of the radial sealing means (1) is a slightly curved convex sealing surface (1a).

6. A sealing system as claimed in claim 4, wherein each of the sealing means (1, 2) is in the form of a one-piece elastomer seal (1* or 2*) embedded by at least one of form locking and frictional connection in a groove (3b or 4b) having sides and widening toward a groove base (3b or 4b), and wherein the seal (1*) is in the form of a high-volume ring.

7. A sealing system as claimed in claim 6, wherein the seal (1*) projects from the groove and overhangs both sides of the groove, the seal being supported in the radial direction by the valve piston (3).

8. A sealing system as claimed in claim 4, wherein the radial sealing surface (2b) of the axial sealing means (2) tapers in the direction of the valve opening movement.

9. A sealing system as claimed in claim 4, wherein the axial sealing surface (2a) of axial sealing means (2), as viewed radially, rises from the interior outward and forms a common circular sealing edge (K) together with the radial sealing surface (2b).

10. A sealing system as claimed in claim 4, wherein the second closure element (4) has a bore (4d) which is oriented coaxially with the cylindrical valve seat surface (5) and is equal in diameter to it.

11. A sealing system as claimed in claim 4, wherein the second closure element (4) has a bore (4d) which is oriented coaxially with the cylindrical valve seat surface, a bore whose internal diameter D4 is different in size from the internal diameter of the cylindrical valve seat surface (5) by from 0 to 1.0 mm.

12. A sealing system as claimed in claim 4, wherein each of the sealing means (1, 2) is in the form of a one-piece elastomer seal (1* or 2*) embedded by at least one of form locking and frictional connection in a groove (4a) widening toward the groove base (4b), and the seal (1*) encloses the first closure element (3) by form locking and frictional connection, so as to effect sealing, in a recess (3g) which is made up of an external jacket surface (3e) formed on the first closure element (3) and an end surface (3f) adjoining this jacket surface (3e).

13. A sealing system as claimed in claim 12, wherein the seal (1*) is provided with an inserted component (1e).

14. A sealing system as claimed in claim 12, wherein the external jacket surface (3e) has a groove (1e) in which a ring (7) is mounted when the seal (1*) is in the embedded position, a section of which ring (7) projecting above the groove (1f) forms effective form locking with the inserted component (1e) inside the jacket surface (3e).

15. A sealing system as claimed in claim 4, wherein the movement of the closure elements (3, 4) toward each other is limited by a stop (4e) which operates only if the relative movement required for achievement of a scheduled fully open position of the valve and for sealing form locking and frictional connection engagement of the radial sealing means and the axial sealing means* is exceeded.

16. A sealing system as claimed in claim 4, wherein the closure elements (3, 4) and the associated sealing means (1 or 2) are made in one piece and the effective area of the sealing means (1, 2) possesses elastomeric properties.

17. A sealing system as claimed in claim 11, wherein the internal diameter of the bore is different in size from the internal diameter of the cylindrical valve seat surface by about 0.4 mm.

18. A sealing system for leakfree switching in a double-seat valve with a first closure element and a second closure element mounted in series and movable relative to each other, which, when the valve is in the closed position, prevent overflow of fluids from a first valve housing component into a second such component and which, in both the closed and the open positions, delimit a leakage cavity (6) which is connected to the surroundings of the valve, with a first closure element (3) having radial sealing means (1) and being in the form of a valve piston and a second closure element (4) being in the form of a seat plate with axial sealing means (2), the system accomplishing movement between the closed position and the open position while preventing flow of fluids into the leakage cavity, the first closure element being received in the closed position so as to effect sealing inside a substantially cylindrical valve seat surface (5), being sealed in the open position with the second closure element (4), and engaging in its opening movement the second closure element (4) before the latter opens, wherein the radial sealing means (1) is mounted at the end of the end section (3d) of the first closure element (3) and is delimited by a radial sealing surface (1c) and an axial sealing surface (1d) which form a continuous surface, wherein the radial sealing surface (1c) operates in conjunction with the cylindrical valve seat surface (5) and wherein an axial sealing surface (2a) of the axial sealing means (2), as viewed in the radial direction, has an external component engageable with an axial valve seat surface (5a) and an internal component engageable with the axial sealing surface (1d) adjoining the radial sealing surface (1c).

19. A sealing system as claimed in claim 18, wherein the axial sealing surface (2a) of sealing means (2), as viewed radially, rises from the interior outward.

* * * * *

UNITED STATES PATENT AND TRADEMARK OFFICE
CERTIFICATE OF CORRECTION

PATENT NO. : 5,732,727
DATED : March 31, 1998
INVENTOR(S) : Hans Otto Mieth et al.

It is certified that error appears in the above-indentified patent and that said Letters Patent is hereby corrected as shown below:

Column 2, line 16, "dement" should read "element".

Column 2, line 48, "sheafing" should read "shearing".

Column 7, line 58, "positi6n" should read "position".

Column 10, lines 22 and 25, "If" should read "1f".

Signed and Sealed this

Twenty-third Day of June, 1998

Attest:

BRUCE LEHMAN

Attesting Officer

Commissioner of Patents and Trademarks